Patented June 26, 1945

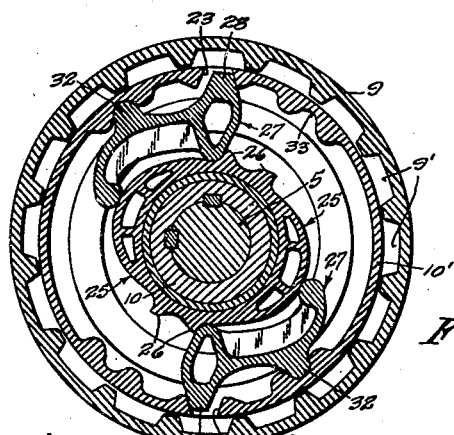

2,379,320

UNITED STATES PATENT OFFICE 2,379,320

CLUTCH MECHANISM

Tyler W. Sprake, Seattle, Wash., assignor to Webster-Brinkley Co., Seattle, Wash., a corporation of Washington Application September 14, 1942, Serial No. 458,343

11 Claims. (Cl. 192—71)

This invention relates to clutch mechanism of a character finding application in hoisting or towing apparatus or, more especially, a windlass, capstan or other piece of marine equipment peculiarized in that the coupling function is performed while the driving element and the working drum are at rest.

For its principal object the invention aims to provide a clutch which is positive in action divorced from any form of a friction clamp.

It is a further object to provide a clutch including a dog or dogs as the coupling medium and which is particularly characterized in that the driving energy exerted through the dog to the working drum inherently acts to lock the dog against retraction from its engaged position. Considered in more particularity, the invention contemplates the provision of a wedge-cam as the activating agent for urging the dog into its enactivating position, a cam, moreover, which is itself free of any driving office but which is so related to the power source that the rotational energy transmitted from the latter to the dog and therefrom to the drum serves the added end of influencing the dog toward the crest of the cam for locking the dog against retractive movement.

It is a further object still to design a clutch of the nature described characterized in that the activating cam permits a reverse mounting of the dog or dogs thereon in allowing the windlass or other machine with which the same is employed to be applied either to a right or a left hand drive.

As a still further and particular object, the invention aims to provide a clutch mechanism including the referred-to dog or dogs as the coupling agent and which is substantially free of springs or an equivalent as a means of influencing the dogs either into or from drum-clutching positions.

Other objects and advantages over clutch devices heretofore devised will, with the foregoing, appear and be understood in the course of the following description and claims, the invention consisting in the novel construction and in the adaptation and combination of parts hereinafter described and claimed.

In the drawings:

Fig. 2 is a transverse vertical section on line 2—2 of Fig. 1; and

Fig. 3 is a transverse vertical section taken to a reduced scale with the brake mechanism deleted and indicating the position of the parts upon a disengagement of the clutch.

Figure 1:
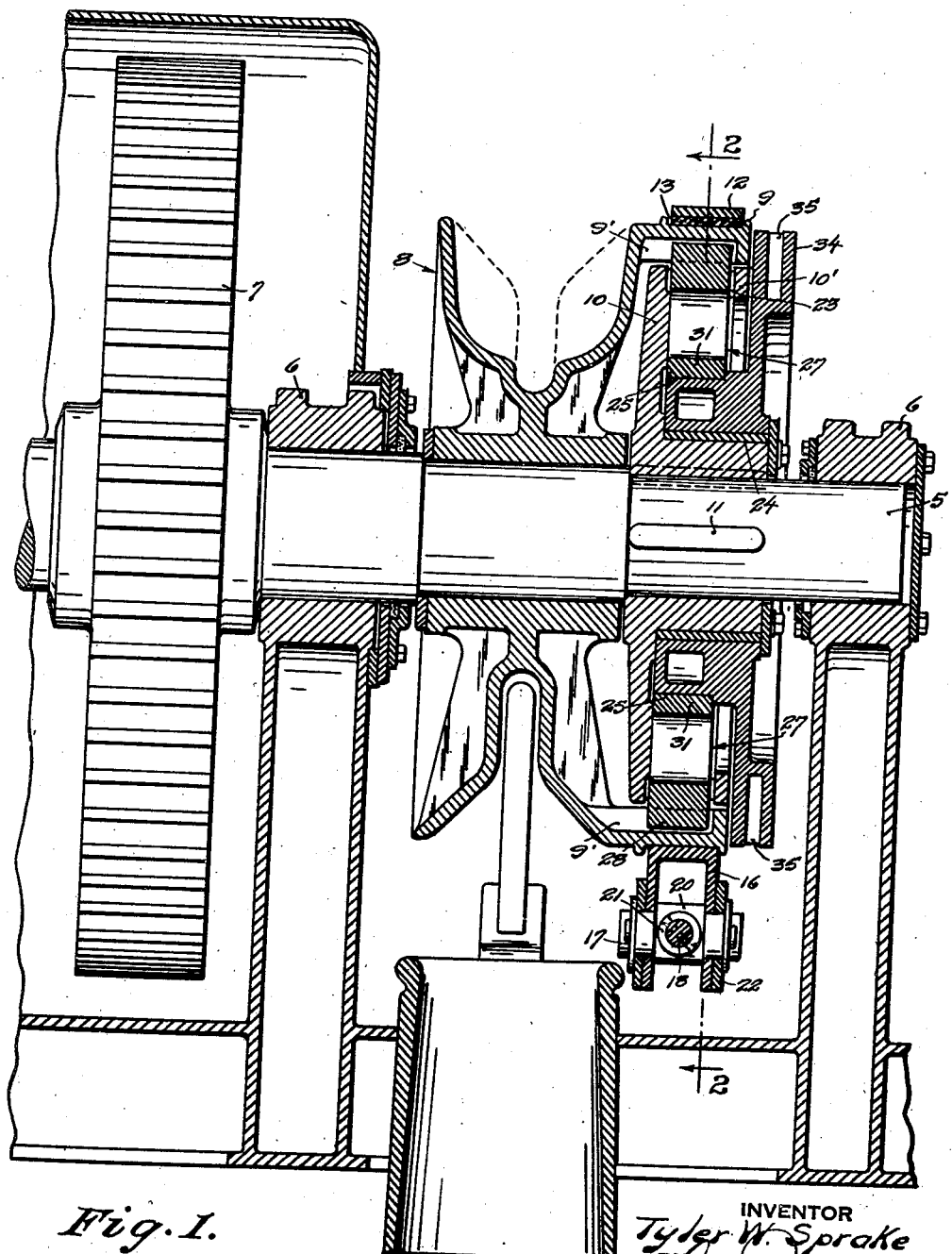
Figure 1 is a longitudinal vertical section showing one side of a two-drum anchor windlass constructed to embody a clutch mechanism according to the present invention, and indicating the clutch in its engaged position.

Having reference to said drawings, the numeral 5 designates a power shaft journaled horizontally in bearings 6 forming the carrick bitts of the windlass and driven by suitable reduction gearing including the gear element 7 from an electric motor or other suitable power source (not shown). Upon such power shaft there is freely journaled a drum 8 which is or may be formed with the usual chain-whelps correlated to the links of an anchor chain, and embodied upon the drum is a circumferential flange 9. This flange lies in surrounding relation to a driving wheel 10 having its hub keyed, as at 11, to the shaft and, for receiving the drive from the driving wheel and which will be hereinafter described, the flange is internally sulcate to present circumferentially spaced channels or sulci 9'.

I provide for the windlass a brake which is or may be of ordinary construction and which is indicated as consisting of a brake strap 12 carrying a lining 13 functional to the external face of the flange. Connection is had, as at 14, from one end of the strap to one arm 15' of a brake lever 15 supported, as is the opposite end of the strap, by a shoe 16, and journaled in the free end of the other arm 15" of the lever is a transverse pin 17 formed with a threaded diametrical bore arranged to receive the threaded end of a brake rod 18. The brake rod is journaled in a block 20 trunnion-mounted in the shoe 16 and carries thrust collars 21 bearing against opposite faces of the block. The input end of the brake rod is coupled, as by a universal connection, to the spindle of a manually set brake wheel (not shown). 22 represents an anchoring link for the brake shoe.

Now reverting to the driving wheel, it will be seen that there is provided therein a circumferential chamber described at the inside by the hub and at the outside by a peripheral flange 10', and piercing the wheel flange as communicating openings between said chamber and the sulciform face of the drum flange are transverse slots 23.

Received within the chamber and journaled upon a bushing 24 is a cam providing diametrically opposite cam faces 25. These cam faces each decline uniformly in opposite directions from a median crest and at the end limit of each such declination terminate in an outwardly cupped stop-foot 26, and functional to each of the cams is a respective floating lever 27 produced, at its outer side, with a dog-forming head 28 arranged to register with a related one of the two flange slots 23. As tracking feet for the levers, the same present spaced-apart toe and heel elements 30 and 31 and are also provided, upon their backs, with a shoulder boss 32 disposed in spaced relation from the dog-head within an arc encompassing lines projected radially through the heel and toe elements, this boss constituting the fulcrum for the lever and finding a seat in a socket 33 described between paired nodules produced upon the internal wall of the wheel flange. Being employed selectively according as to whether the windlass is applied to a port or starboard anchor, the wheel flange provides two such sockets for each of the levers one lying at one and the other at the other side of the related slot 23, the installation being such that the fulcrum is positioned in such relation to the cupped stops of the cam as to cause the leading or toe element 30 of the lever—by the directive course of the driving wheel—to work against its related forwardly disposed stop. By such abutment, the cam is driven in unison with the drum.

As hereinbefore stated, the cam is actuated to couple and uncouple the drum while both the drum and its driving shaft are at rest, and for such actuation I form the cam with an integral turn-piece 34 having radial slots or sockets 35 for the insertion of a hand-bar.

It is thought that the operation of the described structure, taken in connection with the illustration, is clear. Various departures from the preferred embodiment which I have elected to show, and as may become necessary or desired in adapting the teachings to given working requirements, will be largely self-evident to those versed in the art.

What I claim is:

1. In clutch mechanism, in combination: a rotatively mounted driving wheel formed with a peripheral flange describing a chamber interiorly thereof, said flange having a slot therethrough disposed radial to the wheel's rotary axis and being also formed upon its inner face with a bearing recess lying in circumferentially spaced relation to the slot; a driven member normally free to revolve about the center of the wheel as an axis and having a flange overhanging said wheel flange and formed upon its inner face with circumferentially spaced sulci; a lever-dog received in said chamber of the wheel, formed with a shoulder prominence adapted to lodge in said bearing recess of the wheel flange, and having a coupling tooth arranged by movement of the dog about said shoulder prominence as a fulcrum to register with and work through said wheel slot into and out of engagement with a registering sulcus of the driven member; and a control member supported for rotary shifting movements relative to the wheel about the center of the latter as an axis and operatively engaging said lever-dog to cause the latter to rock about its shoulder fulcrum for urging the coupling tooth outwardly by movement in one direction of its revoluble shift and inwardly by movement in the opposite direction of its revoluble shift.

2. In clutch mechanism, in combination: a driving wheel formed with a peripheral flange describing a chamber interiorly thereof, said flange having a slot therethrough and being formed upon its inner face with twin bearing recesses one circumferentially spaced from one side of the slot and the other circumferentially spaced to a like degree from the other side of the slot; a driven wheel normally free to revolve about the center of the driving wheel as an axis and presenting a flange overhanging said driving-wheel flange and formed upon its inner face with circumferentially spaced sulci; a lever-dog received in said chamber of the wheel, formed with a shoulder prominence adapted to be lodged, selectively, in either of said bearing recesses of the wheel flange, and having an outwardly directed coupling tooth arranged by movement of the dog about said selected shoulder prominence as a fulcrum to register with and work through said wheel slot into and out of engagement with a registering sulcus of the driven wheel; and a control member supported for relative revoluble shifting movements about the center of the wheel as an axis and operatively engaging the lever-dog such as will give positive control over the latter at all times and causing the lever-dog to rock about its shoulder prominence as a fulcrum to positively urge the coupling tooth outwardly by movement in one direction of its revoluble shift and positively urge the lever-dog inwardly by movement in the opposite direction of its revoluble shift.

3. Structure according to claim 2 in which the wheel is formed with a hub underlying the flange thereof and describing the said chamber therebetween, said hub acting as a journal mounting for the control member accommodating the relative revoluble shifting movements of the latter.

4. Clutch mechanism comprising, in combination: a drive shaft; a driven member having a free-running journal about the shaft as an axis and formed to present a peripheral flange having pockets disposed at circumferentially spaced intervals and exposed to the inner face of the flange; a control member received internally of the flange, journaled for rotary sifting movements about the shaft as an axis, and formed on its perimeter with a cam-face developed to recede correspondingly in opposite directions, circumferentially considered, from a median crest; a driving wheel driven from the shaft and presenting twin bearings radially off-set from the rotary axis and circumferentially spaced one from the other; and a lever-dog arranged to act about either said bearing, selectively, as a fulcrum, formed to present bearing feet adapted to track upon the cam-face and spaced apart a distance coresponding to the spacing between high-low limits of the cam at opposite sides of a line radial to the shaft projected through the lever fulcrum, and having an outwardly directed coupling tooth circumferentially off-set from said fulcrum and, by response to oppositely directed shifting movements of the control member causing the lever-dog to rock about said fulcrum, movable into and from a registering pocket of the driven member, said permitted selection of either of the twin bearings as a fulcrum mounting for the lever-dog adapting the mechanism to use with a shaft driving the driving wheel in either a right or a left hand direction.

5. Clutch mechanism comprising, in combination: a drive shaft; a driven member having a free-running journal about the shaft as an axis and formed to present a peripheral flange having pockets disposed at circumferentially spaced intervals and exposed to the inner face of the flange; a control member received internally of the flange, journaled for rotary shifting movements about the shaft as an axis, and formed on its perimeter with a cam-face developed to recede correspondingly in opposite directions, circumferentially considered, from a median crest; a driving wheel driven from the shaft; and a lever-dog fulcrumed to the wheel to occupy a position between said flange and the cam-face, formed with bearing feet arranged to track upon the cam-face and spaced apart a distance corresponding to the spacing between high-low limits of the cam at opposite sides of a line radial to the shaft projected through the fulcrum of the lever-dog, and having an outwardly directed coupling tooth off-set from said fulcrum and movable, by oppositely directed shifting movements of the control member causing the lever-dog to rock about said fulcrum, into and from a registering pocket of the driven member.

6. Structure according to claim 5 characterized in that the driving wheel, for transmitting the drive to the driven wheel, presents a lug-forming part occupying a position in intervening relation between the lever-dog and the flange, said lug-forming part being slotted to accommodate the movement of the coupling tooth into and out of engagement with said pockets of the flange and providing a snug fit for the tooth in the engaged position of the latter.

7. Clutch mechanism comprising, in combination: a drive shaft; a driven member having a free-running journal about the shaft as an axis and formed with a peripheral flange having circumferentially spaced pockets therein exposed to the inner face of the flange; a control member received internally of the flange, journaled for rotary shifting movements about the shaft as an axis, and formed on its perimeter with a cam-face developed to recede correspondingly in opposite directions, circumferentially considered, from a median crest; a driving wheel driven from the shaft and presenting a shoulder occupying a position concentric to the axis of the wheel between the flange of the driven member and said cam-face of the control member, said shoulder being formed with twin bearing recesses exposed to the inner face thereof and circumferentially spaced one from the other; and a lever-dog formed with a prominence adapted to fit and arranged to be lodged, selectively, in either said bearing recess, presenting bearing feet arranged to track upon the cam-face and spaced apart a distance corresponding to the spacing between high-low limits of the cam at opposite sides of a line radial to the shaft projected through said fulcrum-forming prominence, and having an outwardly directed coupling tooth circumferentially off-set from the said prominence and, by response to oppositely directed shifting movements of the control member causing the lever-dog to rock about its fulcrum, movable into and from a registering pocket of the driven member, said permitted selection of either of the twin bearings as a fulcrum mounting for the lever-dog adapting the mechanism to use with a shaft driving the driving wheel in either a right or a left hand direction.

8. Cam mechanism comprising, in combination with two members rotatively shiftable one relative to the other and of which one said member is formed upon its periphery with a cam-forming face eccentric to the shifting axis and developed to recede correspondingly in a circumferential direction from opposite sides of a median crest; a lever fulcrumed to the other of said members for rocker movements about an axis parallel to the shifting axis, formed with an outwardly directed tooth circumferentially off-set from said rocker fulcrum, and presenting bearing feet arranged to track upon the cam-face and spaced apart a distance corresponding to the spacing between high-low limits of the cam to occupy positions at opposite sides of a line taken radial to the shifting axis and projected through said rocker fulcrum.

9. Structure according to claim 8 wherein, to permit a reverse mounting of the lever, the member supporting the latter presents twin bearings circumferentially spaced from one another and selectively employed as the rocker fulcrum for the lever.

10. Structure according to claim 8, said member which provides the fulcrum mounting for the lever being formed with a lug-forming part slotted to present an opening guiding the tooth in the rocker movement of the lever, and wherein twin bearings are provided arranged and adapted to be selectively employed as the rocker fulcrum for the lever occupying positions equidistantly spaced, circumferentially considered, from opposite sides of the slot.

11. Cam mechanism comprising, in combination with two members rotatively shiftable one relative to the other about a common axis and of which one said member is provided upon its periphery with a cam-forming face eccentric to the shifting axis and developed correspondingly in opposite directions, circumferentially considered, from center; a lever fulcrumed to the other of said members for rocker movements about an axis parallel to the shifting axis, formed with a radially directed tooth circumferentially offset from said rocker fulcrum, and presenting bearing feet arranged to track upon the cam-face and spaced apart a distance corresponding to the spacing between high-low limits of the cam to occupy positions at opposite sides of a line taken radial to the shifting axis and projected through said rocker fulcrum.

TYLER W. SPRAKE.